United States Patent

[11] 3,632,901

[72] Inventor Harry W. Wally
36 Plaza Street, Brooklyn, N.Y. 11238
[21] Appl. No. 663
[22] Filed Jan. 5, 1970
[45] Patented Jan. 4, 1972

[54] TAPE PLAYBACK ADAPTER FOR PLAYING THROUGH A RADIO RECEIVER
1 Claim, 2 Drawing Figs.

[52] U.S. Cl. ........................................ 179/100.11
[51] Int. Cl. ........................................ G11b 31/00
[50] Field of Search ........................................ 179/100.11, 100.2 Z

[56] References Cited
UNITED STATES PATENTS

| | | | |
|---|---|---|---|
| 2,959,644 | 11/1960 | Grace | 179/100.11 |
| 2,941,737 | 6/1960 | Jones | 179/100.11 |
| 2,867,389 | 1/1959 | Viets | 179/100.11 |

*Primary Examiner*—Stanley M. Urynowicz, Jr.
*Assistant Examiner*—Raymond F. Cardillo, Jr.
*Attorney*—Polachek, Saulsbury & Hough

ABSTRACT: A playback system for a multitrack prerecorded tape cartridge or cassette includes a tape playback adapter for inserting the cartridge or cassette therein. The adapter includes a motor for driving the tape, a magnetic head for picking up audio signals from the tape, a switch for selecting a particular track, an audio amplifier to amplify the picked-up audio signals, a tunable radiofrequency oscillator for generating a carrier, and a modulator for modulating the audio signals on the oscillator. The modulator is connectable via a selector switch to the radiofrequency input terminal of an amplitude or frequency modulated radio broadcast receiver. A radiofrequency antenna is also connectable to the radiofrequency input terminal via the selector switch. Both radio receiver and adapter are energized by a battery power supply connected to both the adapter and radio receiver.

INVENTOR.
HARRY W. WALLY
BY Polachek & Saulsbury
ATTORNEYS

TAPE PLAYBACK ADAPTER FOR PLAYING THROUGH A RADIO RECEIVER

This invention concerns a tape cartridge or cassette playback adapter for playing through an automobile or home radio receiver or a portable radio receiver. Tape cartridge and cassette players heretofore known, have generally included a magnetic pickup head, tape drive motor, audio amplifier, one or more loudspeakers, and battery power supply all embodied in a single unit. Some of these units have included an audio output jack for connecting the output to an external loudspeaker. Due to their small size and for cost and other considerations, the prior tape cartridge or cassette players were not able to provide high audio reproduction quality. Since the prerecorded tape in a tape cartridge generally covers a rather wide audiofrequency range, the reproduction limitations of the conventional tape cartridge or cassette player leaves much to be desired. When such a tape player is used in an automobile, the radio receiver in the automobile is turned off. Thus the high quality radio receiver is not used, while the low quality audio program of the tape cartridge or cassette player is being played. Hereafter, the term "cartridge" shall be deemed to refer to cassettes also.

The present invention is directed at providing a tape playback device whereby the radio receiver in the automobile will be used in conjunction with the tape playback device. According to the invention, the playback device includes a drive motor for driving the prerecorded tape in a cartridge when the cartridge is inserted into the device. A magnetic pickup head picks up the recorded program from a selected track on the tape and feeds the audiofrequency signals to an audio amplifier. This audio amplifier drives an amplitude or frequency modulator which modulates the audio signals on a carrier provided by a tunable radio frequency oscillator preferably in the range of approximately 1,200 kilocycles to 1,450 kilocycles. The modulated radiofrequency signals are then applied via a selector switch to the radiofrequency input terminal of an automobile radio receiver operating on amplitude or frequency modulation. The selector switch will alternatively connect the tape playback or player adapter to the radio receiver or will connect the radio antenna carried by the automobile to the radio receiver. The modulated radiofrequency carrier fed to the radio receiver will be demodulated in the radio receiver, amplified in the audio amplifier of the receiver and reproduced by the loudspeaker of the radio receiver. The automobile battery which energizes the radio receiver is also used to energize the tape playback adapter. By the system described, the tape playback adapter is integrated into the radio and audio reproduction system in the automobile.

The tape playback adapter itself employs transistorized circuitry. The loudspeaker or loudspeakers, battery supply, and high power audio amplifier stage of the conventional cartridge tape player are all eliminated. Important savings in manufacturing cost are thus realized. At the same time improved audio reproduction of the prerecorded tape in the automobile is effected. No changes are required in the radio receiver. Installation of the tape playback adapter involves a few simple connections to the battery of the automobile to the radio receiver and to the radio antenna. No special tools or skills are required to install the tape playback adapter and thereby integrate it into the radio and electrical system of the automobile.

The invention will be explained in further detail in connection with the drawing wherein.

Figure 1:
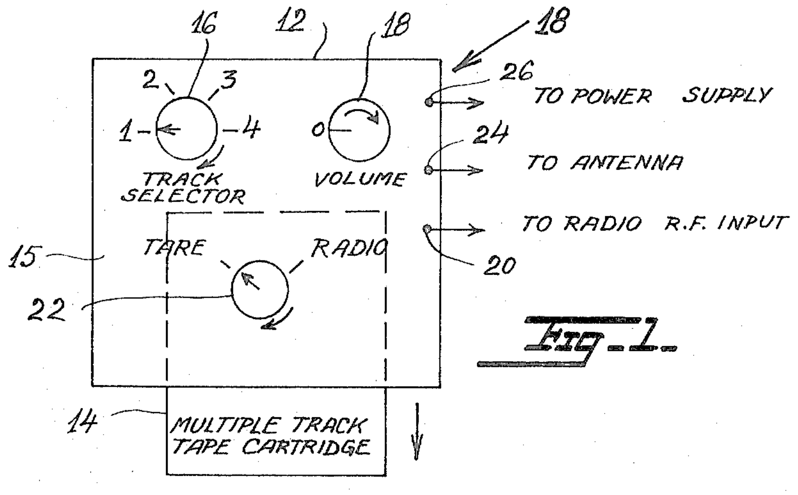
FIG. 1 is a top plan view partially diagrammatic in form of a tape playback adapter or deck embodying the invention.

Referring first to FIG. 1, playback adapter tape or deck 10 comprises a cabinet 12 into one end of which a prerecorded multiple track tape cartridge 14 can be inserted for instant, automatic playing. On panel 15 of the cabinet is a switch or solenoid 16 by means of which any one of a plurality of tracks can be selected for reproduction of the audio program magnetically recorded thereon. A volume control 18 is provided for adjusting the amplitude of signals applied to the radio receiver in the automobile via output terminal 20. Switch 22 in TAPE position enables connection of output terminal 20 to the radio receiver. In RADIO position the switch enables direct connection of the radio antenna in the automobile to the radio receiver via terminal 24. Terminal 26 is provided to connect the tape playback adapter to the battery power supply of the automobile.

Figure 2:
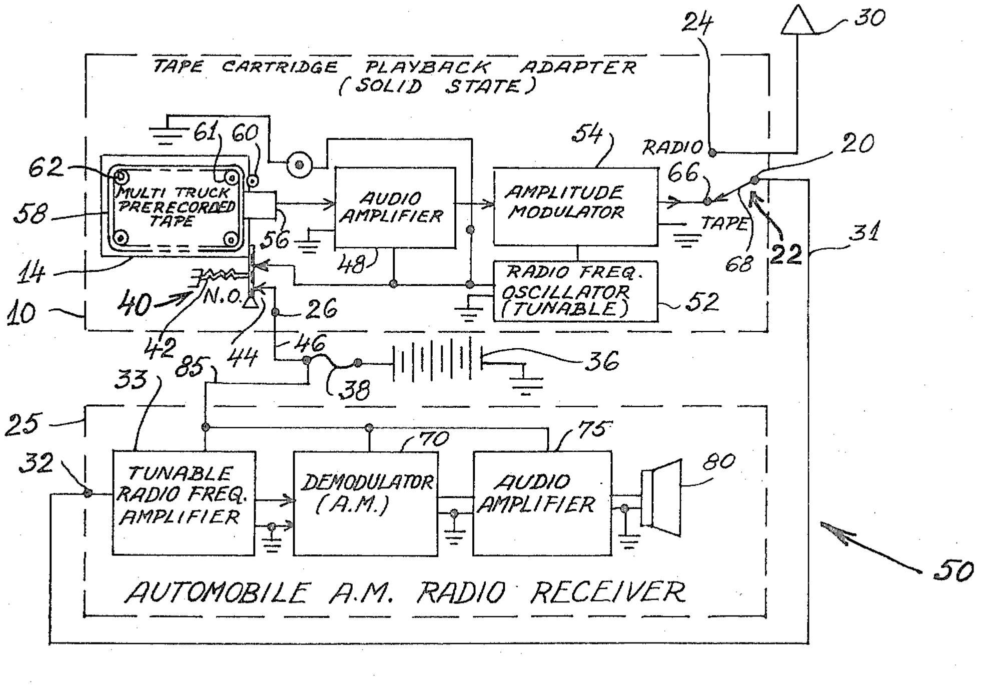
FIG. 2 is a diagram of a system including the tape playback adapter, an automobile radio receiver and power supply.

FIG. 2 shows details of the entire system 50 into which the tape playback adapter 10 is integrated. The system also includes a solid-state, transistorized amplitude or frequency modulation radio receiver 25. Radio receiving antenna 30 is connected to output terminal 24. Output signal terminal 20 is connected via jumper 31 to input terminal 32 of radiofrequency stage 33 of the radio receiver. Power supply terminal 26 is connected to battery 36 of the automobile in which the system is installed, via fuse 38 located at the fuse block of automobile.

The cartridge 14 is inserted into the playback adapter 10 so as to operate pushbutton switch 40. This switch is biased to normally open position by a spring 42. When the cartridge is inserted in the adapter, switch 40 closes to bridge terminals 44 connected in power supply line 46. This supplies power to motor 43, audio amplifier stage 48, radiofrequency oscillator 52 and amplitude modulator 54. Magnetic pickup head 56 picks up the audio signals recorded on a selected track of endless magnetic tape 58 in cartridge 14. Motor 43 in adapter 10 drives a capstan 60 which in turn contacts and drives tape 58 which is carried on drive roller 61 and transfer rollers 62 in cartridge 14.

The audio signals picked up by head 56 are applied to a low-power high fidelity audio amplifier stage 48. The tunable radiofrequency oscillator 52 is tunable internally in the adapter. It generates a carrier which is applied to amplitude modulator 54. This modulates the audio signals fed from stage 48, upon the radiofrequency carrier. The amplitude radiofrequency carrier is applied to terminal 66 of switch 22. When arm 68 is thrown to terminal 66 at TAPE position, the amplitude or frequency modulated signals are fed via output terminal 20 and jumper 31 to radiofrequency input terminal 32 of radio receiver 25. When arm 68 is thrown to terminal 24 and radio input terminal 32 via terminals 20 and 24.

In radio receiver 25, the received amplitude or frequency modulated program from the playback adapter 10 is demodulated by demodulator 70 and the audio output is amplified by high fidelity audio amplifier stage 75. The amplified audio signals are reproduced by the high quality loudspeaker 80. The amplifier stages 33 and 75 and the demodulator 70 are energized by battery 36 connected to the radio receiver via fuse 38 and powerline 85.

By the arrangement and circuitry described, it will be apparent that the tape cartridge playback adapter is integrated into the radio, audio and electrical system of the automobile. The user has the benefit of the superior audio amplifier and loudspeaker of the radio receiver. No internal changes in the radio receiver are required. The external antenna is selectively connected to the radio receiver to supply radio broadcast programs in conventional fashion when switch 22 on the adapter is set to RADIO position. The cartridge can be pulled out of the adapter and instantly replaced with another. The transistorized, solid-state stages of the adapter provide instant audio reproduction through the transistorized radio receiver 25. If desired, the volume control 18 can be set at maximum and thereafter it need not be operated, since the volume control (not shown) of the radio receiver can be used to control volume to satisfactory levels. The volume control 18 can be omitted if desired to effect a further saving in cost and simplication of the circuitry of the adapter 10.

In any case the adapter is so integrated into the radio and electrical system of the automobile, that it derives its power from the car battery, it transmits audio signals via the radiofrequency and demodulator stages of the receiver, and reproduces the audio program via the audio amplifier stage and loudspeaker of the radio receiver.

The adapter or playback deck described, will fulfill a long felt need in the art to provide the user of a tape cartridge playback device with the same high quality of audio reproduction that he obtains from the high quality transistorized radio receiver in his automobile. While an automobile radio receiver has been referred to, it will be understood that the invention is applicable to any home radio receiver or portable radio receiver.

In the following claims the term "cartridge" shall be deemed to refer also to cassettes or any other type of magazine containing a reel of prerecorded tape.

What is claimed is:

1. A playback system for a multitrack prerecorded tape cartridge, comprising: a tape playback adapter, said adapter including a cabinet adapted for inserting said tape cartridge therein; a motor in the cabinet for driving the prerecorded tape, a magnetic head in the cabinet for magnetically picking up a recorded audio program from a selected track on the tape; an audio amplifier stage connected to said head for amplifying audio signals picked up by the head; a radiofrequency oscillator for generating a radiofrequency carrier; modulator circuit means connecting said oscillator and audio amplifier stage to the modulator for modulating the audio signals on the carrier; two output terminals, one terminal being connectable to a radiofrequency input terminal of a radio receiver, the other terminal being connectable to a radiofrequency receiving antenna; a two-position switch selectively connecting said modulator to either of said two output terminals for selectively applying to said radio receiver the amplitude modulated signals from the modulator, and radio broadcast signals picked up by said antenna; an amplitude modulated, radio receiver comprising a tunable radiofrequency amplifier stage connected to said one terminal of the adapter; a demodulator connected to said radiofrequency amplifier stage for demodulating amplitude modulated signals applied thereto; a high fidelity audio amplifier connected to said demodulator for amplifying audio signals derived from the demodulator; a high quality loudspeaker connected to said high fidelity radio amplifier for reproducing audibly with high fidelity the audio signals amplified by the last named audio amplifier; a radiofrequency receiving antenna connected to said other output terminal of the adapter whereby setting said two-position switch to one position connects the amplitude modulator of the adapter to said radiofrequency amplifier stage of the radio receiver, and setting said switch to its other position connects the antenna to the radiofrequency amplifier stage of the radio receiver; a battery power supply, and electrical power lines connecting said battery power supply to the motor, audio amplifier stage, oscillator and modulator in said adapter, and also connecting said battery power supply to said radiofrequency stage, demodulator and audio amplifier in said radio receiver; a power switch activatable and deactivatable to make and break circuit in said power lines by insertion and withdrawal of a tape cartridge into said cabinet; and wherein said oscillator is tunable to any one frequency in the amplitude modulation broadcast band.

* * * * *